United States Patent [19]

Jones

[11] 4,062,326
[45] Dec. 13, 1977

[54] ROTARY ENGINE WITH ROTARY INTAKE VALVE

[75] Inventor: Charles Jones, Hillsdale, N.J.

[73] Assignee: Curtiss-Wright Corporation, Wood-Ridge, N.J.

[21] Appl. No.: 747,016

[22] Filed: Dec. 2, 1976

[51] Int. Cl.² .............................................. F02B 53/10
[52] U.S. Cl. ................................. 123/8.09; 123/8.45
[58] Field of Search ..................... 123/8.01, 8.09, 8.45

[56] References Cited

U.S. PATENT DOCUMENTS

| | | | |
|---|---|---|---|
| 3,347,213 | 10/1967 | Froede | 123/8.45 |
| 3,844,256 | 10/1974 | Ishikawa et al. | 123/8.45 |
| 3,886,911 | 6/1975 | Glatt | 123/8.45 |
| 3,934,558 | 1/1976 | Wilmers | 123/8.45 |
| 3,958,539 | 5/1976 | Satow et al. | 123/8.09 |

Primary Examiner—Carlton R. Croyle
Assistant Examiner—Leonard Smith
Attorney, Agent, or Firm—Victor D. Behn; Arthur Frederick

[57] ABSTRACT

A rotary internal combustion engine having a variable rotary throttle valve in the engine intake passage immediately adjacent to the discharge end of said passage with the axis of the rotary valve being disposed substantially at right angles to the engine internal surface through which the discharge end of said passage opens.

11 Claims, 12 Drawing Figures

ROTARY ENGINE WITH ROTARY INTAKE VALVE

BACKGROUND OF THE INVENTION

This invention concerns rotary engines of the type shown in U.S. Pat. No. 2,988,065 granted on June 13, 1961 to Wankel et al. More particularly, the invention concerns such engines having a throttle valve in the air intake passage adjacent to the downstream end of said passage such as shown in U.S. Pat. No. 3,347,213 granted Oct. 17, 1967 to Froede; U.S. Pat. No. 3,937,186 granted Feb. 10, 1976 to Stock; U.S. Pat. No. 3,916,846 granted Nov. 4, 1975 to Kromer; and U.S. Pat. No. 3,844,256 granted Oct. 29, 1974 to Ishikawa et al. In these prior patents the prime reason for so locating the throttle valve is to reduce the amount of exhaust gases which are drawn into the intake passage, particularly during idling operation of the engine as a result of overlap of the intake and exhaust passages, and to increase the flow-velocity of the intake charge into the engine working chambers.

SUMMARY OF THE INVENTION

It is an object of the present invention to provide a rotary engine intake throttle valve arrangement to further reduce the amount of exhaust gases which may be drawn into the engine intake passage and at the same time to provide such an arrangement in which the engine intake passage is closed earlier to each working chamber during idling and low power operation than it is during higher power operation of the engine. This latter feature is important because for idling and low power operation, it is not only desirable to reduce the magnitude of the exhaust gases drawn into the engine intake passage, but it also is desirable to close the engine intake passage earlier to each engine working chamber as compared to intake passage closure at higher power operation. Thus, at low power, low speed operation, it is desirable to close each intake passage to a working chamber before the chamber moves any substantial distance beyond its bottom dead center position to avoid the possibility of subsequent compression of the charge in said chamber forcing some of the charge back into the intake passage. However, because of the larger inertia of the incoming charge at higher engine speed and power, it is possible to keep the intake passage open to each working chamber some distance beyond the bottom dead center position of said chamber without danger of said reverse flow. Hence, at higher engine speeds and powers, it is desirable to close the intake passage later to each working chamber so as to provide more time for the larger charge to enter each chamber.

More specifically, the rotary engine includes a rotary intake throttle valve having its axis disposed substantially at right angles to the engine internal surface through which the discharge end of said passage opens whereby the valve can be disposed closer to the engine internal surface than in the aforementioned prior art thereby further reducing the volume of the intake passage exposed to engine exhaust gases. Furthermore, by properly locating the ports in such a rotary intake throttle valve, it is possible to have the intake passage close earlier to each engine working chamber during engine idling and low power operation.

Accordingly, it is a further object of this invention to provide a rotary intake throttle valve for a rotary engine in which the rotary throttle valve is disposed close to and has its axis disposed substantially at right angles to the engine surface with the porting of said valve being arranged so that during idling and low power operation the intake passage closes earlier to the engine working chambers than during higher power operation. The invention has been illustrated in connection with a rotary engine having a peripheral intake port, that is, an intake port in the multi-lobe surface of the engine. The invention is particularly applicable to such intake ports because of the relatively large intake and exhaust port overlap in engines having peripheral intake ports as compared to rotary engines having intake ports in the engine side housing. However, as will be apparent, the invention is also applicable to rotary engines having side housing intake ports. In addition, the invention is applicable to rotary engines having both side and peripheral intake ports.

Other objects of the invention will become apparent upon reading the annexed detailed description in connection with the drawing.

DESCRIPTION OF PREFERRED EMBODIMENTS

Figure 1:
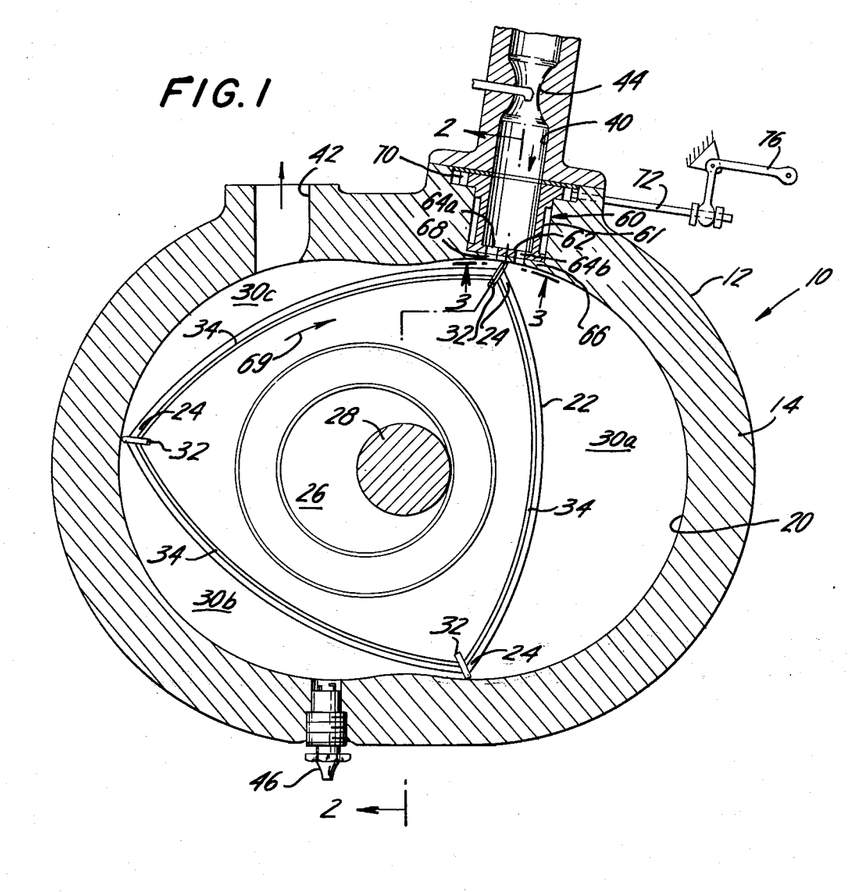
FIG. 1 is a transverse sectional view of a rotary engine embodying the invention taken along line 1—1 of FIG. 2, the section through the intake valve being more clearly indicated by line 1—1 of FIG. 3.
Figure 2:
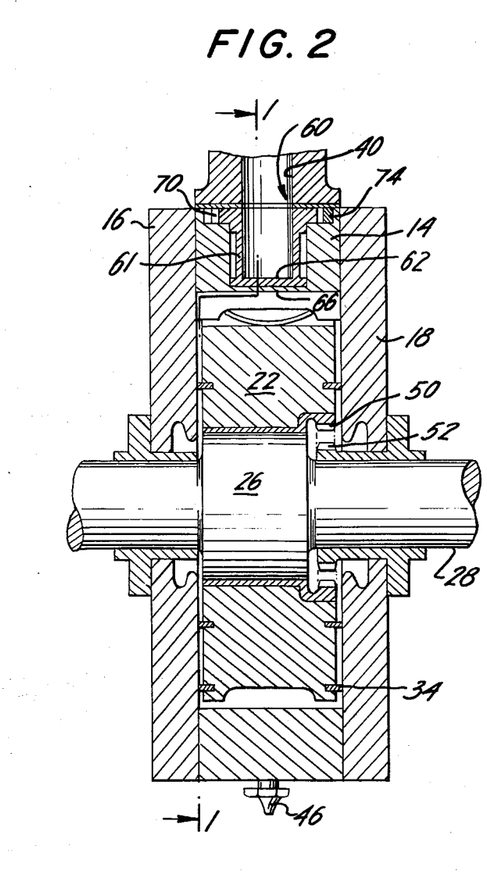
FIG. 2 is a sectional view taken along line 2—2 of FIG. 1.

Referring first particularly to FIGS. 1 and 2 of the drawings, a rotary internal combustion engine is schematically indicated at 10. The engine comprises an outer body or housing 12 consisting of an intermediate or rotor housing 14 and two axially spaced end housings 16 and 18 secured together to form an engine cavity therebetween. The peripheral inner surface 20 of the rotor housing 14, as viewed in FIG. 1, has a multi-lobe profile which preferably is essentially an epitrochoid and which, as illustrated, has two lobes.

An inner body or rotor 22, having a plurality of apex portions 24 (three as illustrated) is journaled for rotation within the engine cavity on the eccentric portion 26 of a shaft 28, said shaft extending co-axially through the housing 12. The apex portions 24 of the rotor 22 have sealing cooperation with the peripheral inner surface 20 of the housing to form a plurality (three) of working chambers 30 between the rotor and said surface (the three chambers 30 being separately identified in FIG. 1 by the reference letters a, b and c). For this purpose, each apex portion 24 of the rotor has apex seals 32 extending thereacross in a rotor groove disposed parallel to the rotor axis. Suitable side seal strips 34 are also provided on each end face of the rotor adjacent to the rotor periphery with each side seal strip 34 extending from one apex seal 32 to an adjacent apex seal to complete the seal grid around each working chamber 30.

The outer body or housing 12 is also provided with an intake passage 40 and an exhaust passage 42 disposed on opposite sides of and adjacent to one of the junctions of the lobes of the two-lobe surface 20. The intake passage 40 is provided with a carburetor, schematically indicated at 44, for regulating the fuel supplied to said passage. In addition, a spark plug 46 is mounted on the housing 12 adjacent to the other junction of the two-lobe surface 20. An internal gear 50 is co-axially secured to the rotor 22 at one end face of the rotor and a fixed external gear 52 is secured to the adjacent end housing (18 as illustrated). The gearing 50 and 52 controls the rotation of the rotor 22 relative to the shaft 28 and housing 12.

The engine structure so far described, is conventional. With such an engine, during engine operation and with the rotor 22 rotating clockwise as viewed in FIG. 1, the volume of each working chamber 30 periodically increases and decreases to go through a four-stroke cycle.

In accordance with the present invention, the engine intake passage 40 is provided with a rotary valve 60 having its axis substantially normal to the trochoid surface 20. The valve 60 consists of a sleeve portion 61 rotatably supported in the passage 40 and having a partition or disc portion 62 disposed across the inner end of the sleeve 61 to provide the valve 60 with a cup-shaped structure. The valve disc portion 62 has a plurality of valve apertures or openings 64 therethrough. The inner end of the intake passage 40 also has a partition 66 thereacross, the inner surface of this latter partition being substantially flush with the trochoid surface 20. The rotatable valve disc 62 lies against the passage partition 66 and the valve apertures or openings 64 in the valve disc 62 cooperate with port openings 68 in the passage partition 66 to provide a throttle valve for the intake passage 40.

Since the passage partition 66 is flush with the trochoid surface, then except for the small space provided by the port openings 68 in this partition, there is no space for exhaust gases to accumulate in the intake passage 40 downstream of the throttle valve as a result of overlap between the intake and exhaust passages 40 and 42. Therefore, with the rotary intake throttle valve 60 of the present invention, the amount of exhaust gases which are carried over into each working chamber 30 in its intake phase is materially reduced compared to the exhaust gas carry-over with the intake valve arrangements of the aforementioned patents also having throttle valves in the intake passage adjacent to the downstream end of said passage. This is particularly so since the partition 66 can be made quite thin inasmuch as the pressure differentials across this partition during engine operation are quite small.

Figure 3:
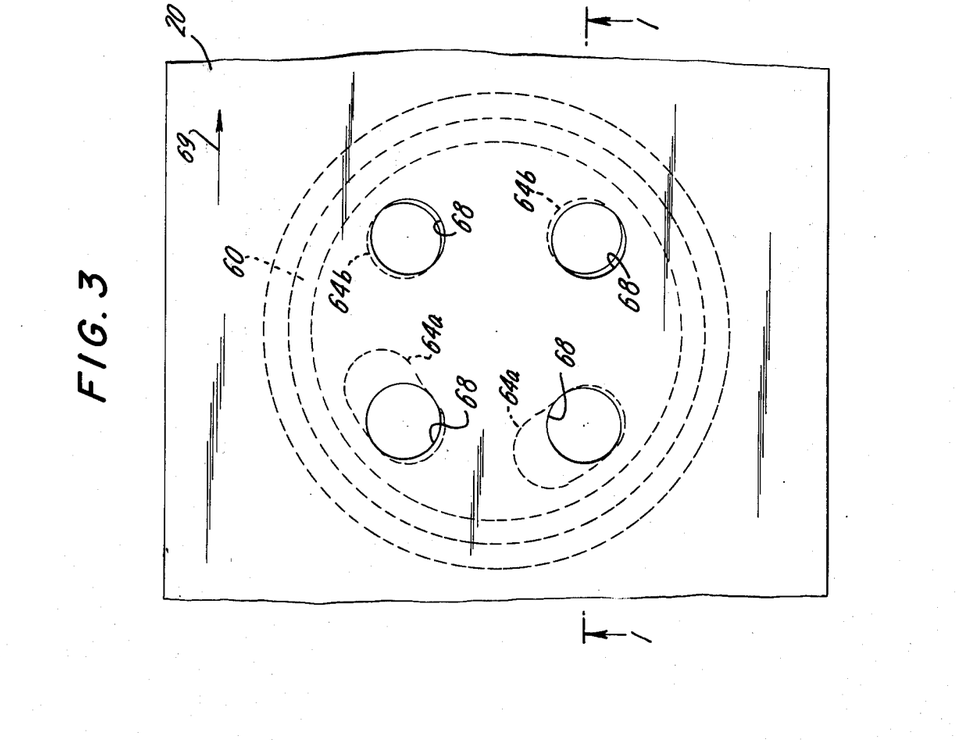
FIG. 3 is an enlarged, partial view taken along line 3—3 of FIG. 1, showing the rotary intake throttle valve in its full open position.
Figure 4:
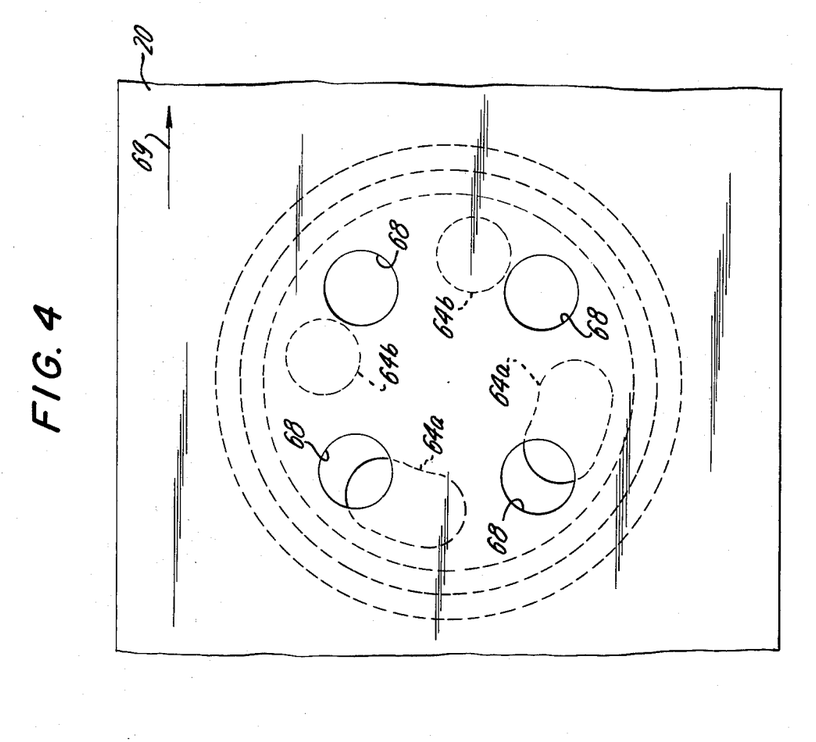
FIGS. 4 and 5 are views similar to FIG. 3 but with the rotary valve in a partially open position and in a closed position, respectively.
Figure 5:
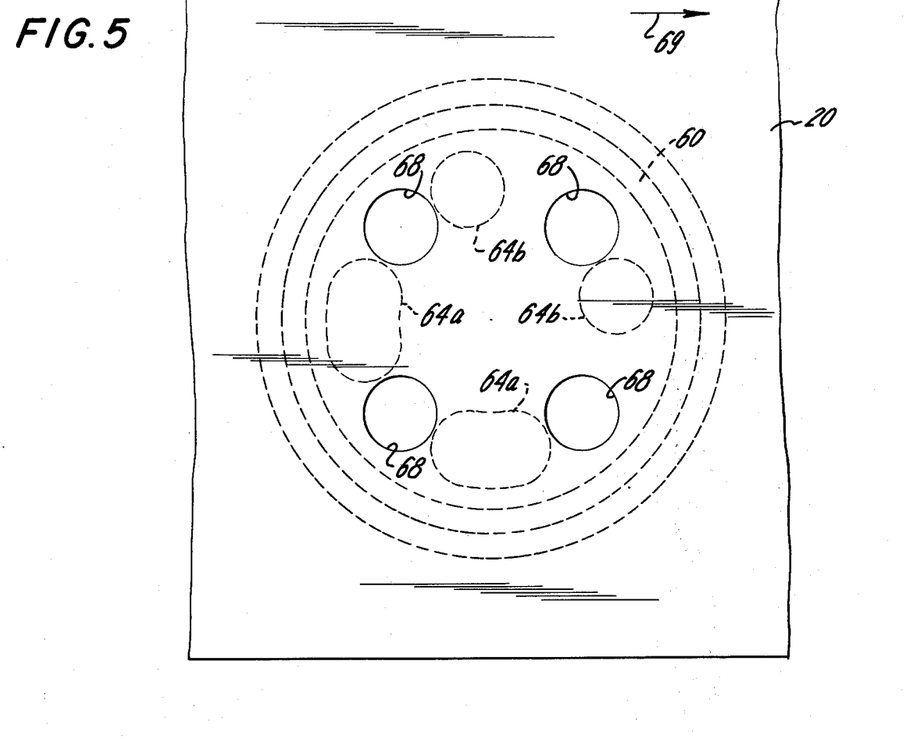

As illustrated, and as best seen in FIGS. 3-5, the rotary valve disc 62 is provided with four valve apertures or openings 64, two of which are circumferentially elongated and designated 64a while the other two are circular in cross-section and designated 64b. The partition 66 across the downstream end of the passage 40 is provided with four port openings 68 each being circular in cross-section and each cooperating with one of valve disc apertures 64.

In FIG. 3, the rotary throttle valve 60 is shown in its substantially fully open position. The two elongated valve apertures 64a in the rotary valve disc 62 register fully with their cooperating port openings 68 in the passage partition 66 and the two circular valve apertures 64b in said valve disc are substantially fully in register with the other two port openings 68. A slight rotation clockwise (as viewed in FIG. 3) would bring the rotary valve circular apertures 64b in full register with their associated valve port openings 68 and the rotary valve elongated apertures 64a would remain in full register with the associated port openings 68.

In FIG. 4, the rotary valve 60 has been rotated counterclockwise from its position of FIG. 3 to a part-throttle, low-power position. As shown in FIG. 4, the elongate valve apertures 64a are now only partly in register with the port openings 68 while the circular valve apertures 64b are now out of registry with their port openings 68.

In FIG. 5, the rotary valve 60 has been rotated further in a counter-clockwise direction to its fully closed position. In this position, all the valve apertures 64a and 64b are out of register with the port openings 68.

Reference is now again made to FIG. 3 where the rotary throttle valve 60 is fully open in that each of the port openings 68 are substantially fully uncovered by a rotary valve opening 64. Since the ports 68 are symmetrically placed about the axis of the intake passage 40, the center of area of the effective open area of the ports 68, in this fully open position of FIG. 3, is substantially on the axis of said intake passage 40.

In FIG. 4 when the rotary throttle valve 60 has been rotated to a slightly open position, the two ports 68 which are on the downstream side (relative to the — indicated by the arrow 69 — direction of rotation of the rotor 22) of the axis of the intake passage 40 are now closed while the two ports 68 which are on the upstream side of said axis are now partly open. Hence, valve-closing movement of the rotary throttle valve 60 from its position of FIG. 3 to that of FIG. 4 has resulted in the center of area of the effective open area of the ports 68 shifting in an upstream direction, relative to the direction 69 of rotation of the rotor 22.

The effect of this shift of the center of area of the effective port opening can best be seen in FIG. 1. In FIG. 1, as in FIG. 3, the sleeve rotary valve 60 is in its fully open position. With the rotor 22 in its position of FIG. 1, the working chamber 30a is just slightly beyond its bottom dead center position and therefore compression is just starting in this chamber. However, in this rotor position and with the rotary throttle valve 60 fully open, although the two upstream (relative to rotor rotation) ports 68 are no longer open to the working chamber 30a, the two downstream ports 68 are still open to said chamber. Hence, with rotary throttle valve 60 in its fully open position, the intake ports 68 will not be fully closed to each working chamber until that chamber has moved beyond its bottom dead center position thereby providing more time for the full charge to enter into each working chamber. Also, because of the relatively large inertia of the full charge, compared to that of a partial charge, the intake passage 40 can remain open to each working chamber 30 for some time beyond the bottom dead center position of said chamber without the compression in the chamber causing any appreciable reverse flow of the charge from a working chamber back into the intake passage 40.

When, however, the throttle valve 50 is in a slightly open position, as in FIG. 4, then only the two upstream (relative to rotor rotation) ports 68 are open, that is, are uncovered by the throttle valve 60. Accordingly, in this position of the throttle valve 60, the two downstream ports 68 are closed. Therefore, when the rotor 22 is in its position of FIG. 1 and the throttle valve 60 is in a slightly open position (as in FIG. 4) the intake ports 68 are no longer open to the working chamber 30a. Thus, with the throttle valve 60 in its part throttle position of FIG. 4, each working chamber 30 closes to the intake port when it reaches its bottom dead center position (corresponding to the position of chamber 30a in FIG. 1) thereby avoiding the possibility of any reverse flow of the charge from a working chamber 30 back into the intake passage 40 as a result of subsequent compression of the charge in that chamber.

Although each working chamber 30 closes earlier to the intake passage 40 when the rotary throttle valve 60 is in a part-throttle position (as in FIG. 4) as compared to when said throttle valve is in its full open position, there is ample time for the charge to enter the chamber. When, however, the throttle valve 50 is in a more fully open position, each working chamber 30 closes later to the intake passage 40 thereby providing more time for the larger charge to enter the chamber.

In order to control the rotative position of the sleeve 62 of the throttle valve 60, it is provided with a gear 70 at its outer end and a rod 72 has a gear rack 74 disposed in mesh with the sleeve gear 70. A bell crank lever 76 has one end operatively connected to the rack rod 72 and its other end is for connection to the engine power control. In this way the throttle valve 60 can be rotated by the rack rod 72 to vary the extent to which the throttle valve 60 uncovers the intake passage ports 68. Spring means (not shown) preferably are provided for urging the valve 60 radially inwardly so as to maintain contact between the rotary disc portion 62 of the valve and the intake port partition 66.

The invention has been described in connection with a rotary engine having a peripheral intake port, that is, an intake port opening through the trochoid surface 20. The invention can also be applied to rotary engines in which the intake port opens through the inner surface of one or both of the side housings 16 and 18, for example, as disclosed in U.S. Pat. No. 3,103,208 granted Sept. 10, 1963 to Price et al. However, with such a side intake port there is relatively little overlap between the intake and exhaust ports as compared to that existing in a rotary engine having a peripheral intake port. Hence, with a side intake port, the amount of exhaust gases which could be drawn into the intake port is quite small and, therefore, with a side intake port there is less reason for locating the intake throttle valve close to the downstream end of the intake passage. Nevertheless, as in the case of a peripheral intake port, by providing a side intake port with a rotary throttle valve similar to the rotary disc valve 60 of FIGS. 1-5, the flow velocity of the intake charge into each working chamber during idling and low power operation can be increased and each working chamber can be closed later to the intake passage as the valve is moved toward its full open position. It is clear, therefore, that the rotary disc valve of the invention is not limited to use in a peripheral intake port of a rotary engine but can also be used in a side intake port of a rotary engine.

The invention also is not limited to the particular rotary disc valve configuration disclosed in FIGS. 3-5, nor is it limited to a configuration in which the only change in timing is one in which each working chamber closes later to the intake passage as the valve is moved toward its fully open position. For example, the rotary disc valve could be designed to open earlier as well as closing later to each working chamber as the valve is moved toward its fully open position thereby providing additional time for the charge to enter each working chamber during high power operation. Such a modification is shown in FIGS. 6-9. Except for its rotary disc valve and the physical arrangement of its intake ports, the engine of FIGS. 6-9 is similar to that of FIGS. 1-5 and, therefore, like parts are identified by the same reference numerals.

In FIGS. 6-9, a rotary disc valve 110 is disposed in the engine intake passage 40 with the disc portion of the valve consisting of two sectors 112a and 112b of a circle. The valve disc sectors 112a and 112b are attached to and are disposed on diametrically opposite sides of a central shaft 114 for rotating the valve. For this purpose, the shaft 114 is connected to the engine power control by means (not shown) analogous to the linkage and gearing 70-76 of FIG. 1.

The rotatable disc portions 112a and 112b of the valve 110 are held against a partition 116 disposed across the downstream end of the intake passage 40, for example, by a spring not shown. The valve disc portions 112a and 112b are rotatable relative to the partition 116 which is flush with the trochoid surface 20 and is provided with a plurality of intake port openings therethrough. These intake port openings are disposed in two groups 118a and 118b arranged for cooperation with the valve disc sectors 112a and 112b respectively. The area outlined by each group of port openings 118a and 118b has a shape similar to that of its associated valve disc sector 112a and 112b so that in one position, that of FIG. 6, the valve disc sectors 112a and 112b close the port openings 118a and 118b except for the small open area provided by the notches 120a and 120b in the valve disc 112a and 112b for engine idling operation.

Figure 6:
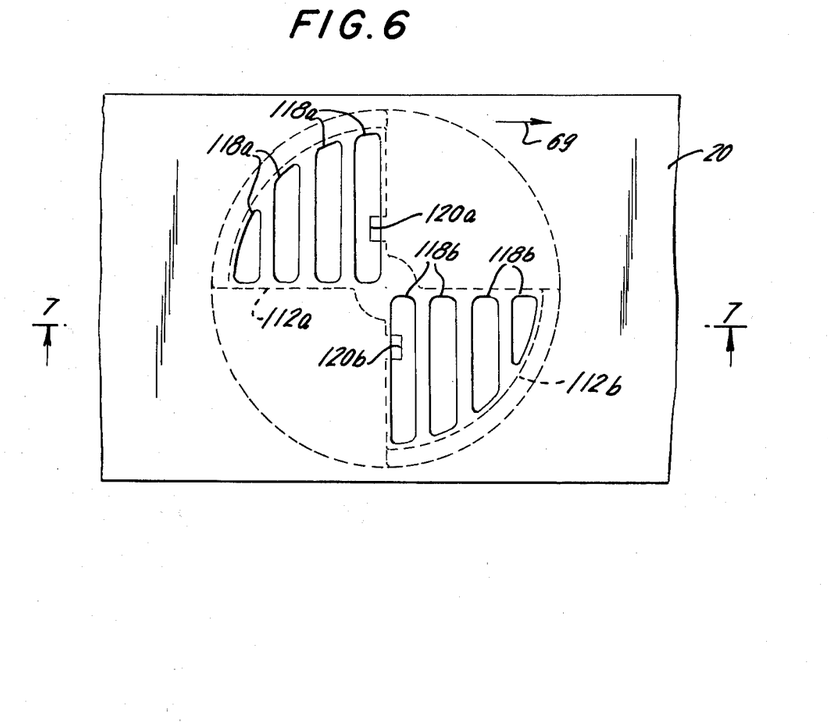
FIG. 6 is a view similar to FIGS. 3-5 but showing a modified form of disc valve with the valve in its substantially closed position.
Figure 7:
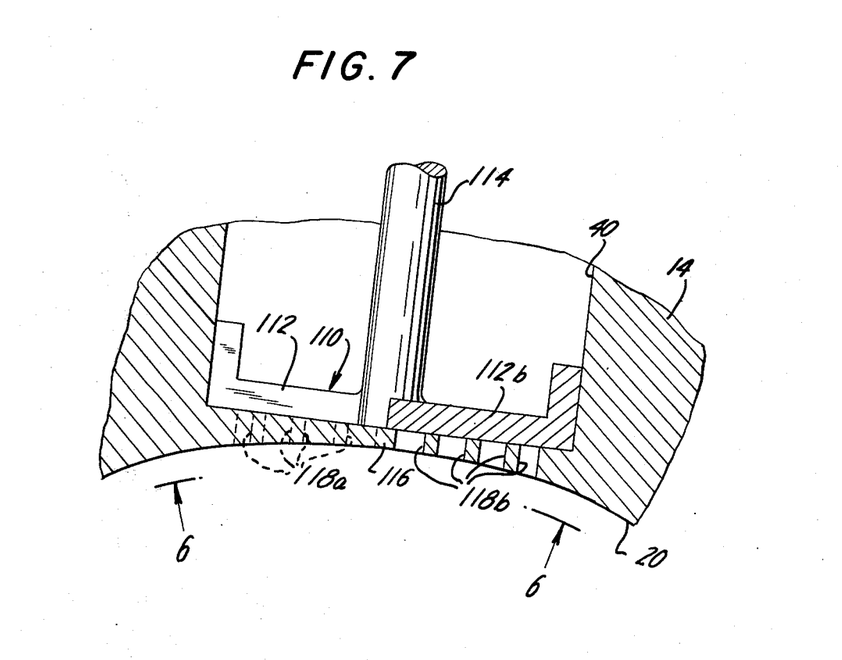
FIG. 7 is a sectional view taken along line 7—7 of FIG. 6.
Figure 8:
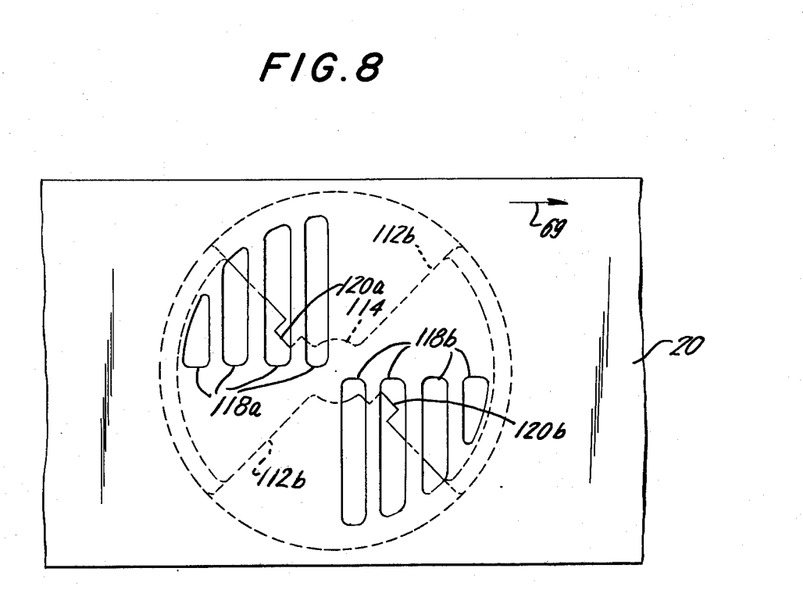
FIGS. 8 and 9 are views similar to FIG. 6 but showing the valve in partly open and fully open positions.
Figure 9:
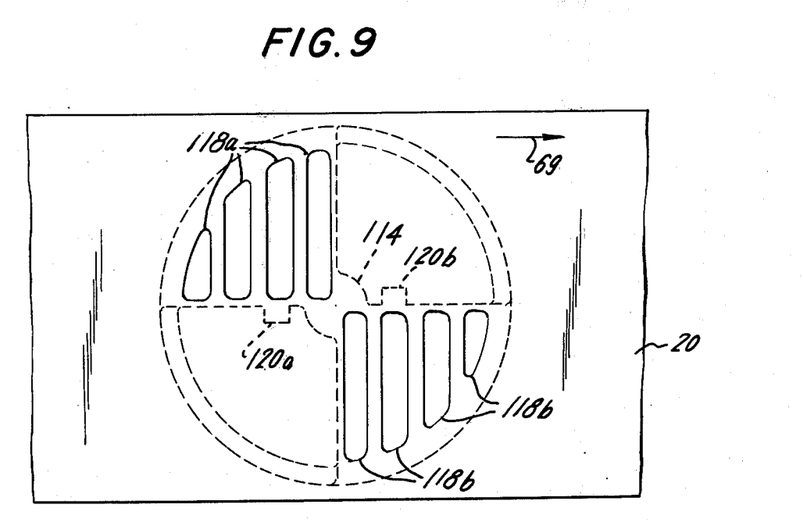

As the rotary valve 110 is rotated counter-clockwise from its intake port closing position of FIG. 6 toward its partly open position of FIG. 8, the portions of the port openings 118a and 118b closest, in a circumferential direction, to the valve shaft 114, open first and finally when the valve is moved to its fully open position of FIG. 9, all the port openings 118a and 118b are open including those portions most removed from the shaft 114 in a circumferential direction.

It is apparent from FIGS. 6-9 that as the disc valve 110 is rotated counter-clockwise (as viewed in these figures) from its closed position of FIG. 6 to its open position of FIG. 9, that the effective open area of the intake port extends further downstream as well as upstream relative to the direction 69 of rotor rotation (indicated by arrow 69). Hence, with the intake valve and port configuration of FIGS. 6-9, as the valve is moved to open further, each working chamber 30 not only closes later to the intake passage 40 as in FIGS. 1-5 but also opens earlier to the intake passage.

Figure 10:
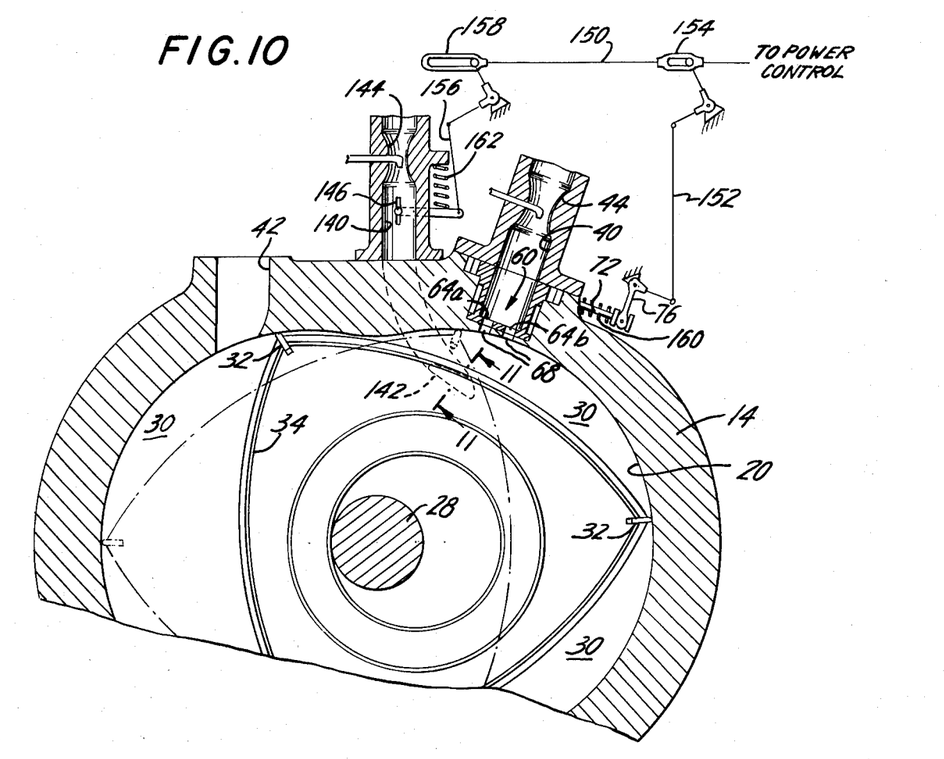
FIG. 10 is a transverse sectional view of a modification of this invention as applied to an engine having side and peripheral intake ports.
Figure 11:
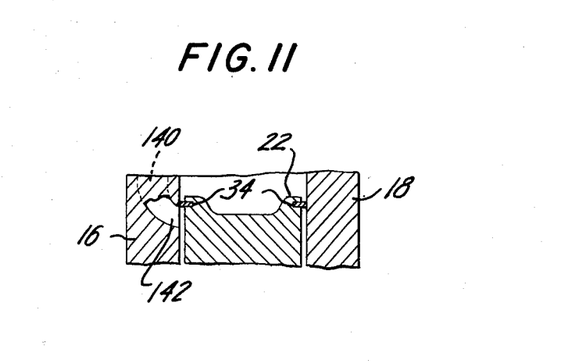
FIG. 11 is a sectional view taken along line 11—11 of FIG. 10.

As already noted, the rotary disc throttle valve of the present invention is primarily useful in rotary engines having a peripheral intake port. It is also advantageous to use such a rotary valve in the peripheral intake port of a rotary engine also having a side intake port in which, at idle and low power operation, all the intake charge is supplied through the side intake port. Such an embodiment of the invention is shown in FIGS. 10-11. Except for the addition of a side intake port and its associated passage and carburetor, the rotary engine of FIGS. 10-11 is similar to that of FIGS. 1-5 and, therefore, like parts are identified by the same reference numerals.

In FIGS. 10-11, the rotary engine is provided with an auxiliary intake passage 140 terminating in a side intake port 142. The intake passage 140 has its own carburetor 114 and throttle valve 146. Obviously, the carburetors 44 and 144 could be housed in a unitary housing structure much like a two-barrel carburetor but with separate engine intake passages 40 and 140. For ease of illustration, the valve 146 has been illustrated as a conventional flaptype valve. It is obvious, however, that the throttle valve for the auxiliary intake passage 140 could be a rotary disc valve (similar, for example, to the rotary disc valve 60) disposed at the side intake port 142.

In FIGS. 10-11, the throttle valve 60 for the main intake passage is arranged to be closed during idle and low power operation so that, during such operation, all the intake charge is taken in through the auxiliary intake passage 140 and port 142 whereas, at higher and full power operations of the engine, the major portion of the intake charge is taken in through the relatively larger opening provided by the ports 68 for the main intake passage 40. Accordingly, the auxiliary intake port 142 can be made relatively small to increase the velocity at which the intake charge enters the engine working chambers during low power operation. Also, the small side intake port 142 can be disposed so that it does not open to a working chamber until that chamber is closed to the exhaust port. Thus, as illustrated in FIG. 10, with the rotor 22 in its full line position, the upper chamber 30 (as viewed in FIG. 10) has just closed to the exhaust port 42 and has not yet, but is about to, open to the auxiliary intake port 142. Also, because the main intake passage 40 is closed at low power operation, the auxiliary intake port 142 can be closed to a working chamber 30 before that chamber reaches its bottom-dead-center position, thereby avoiding the possibility of compression in that chamber forcing some of the charge-back out through the auxiliary intake port before it closes. This is shown in FIG. 10 by the dot-dash line position of the rotor in which the right-hand working chamber 30 is now at its bottom dead center position and that chamber is already closed to the auxiliary intake port 142.

Figure 12:
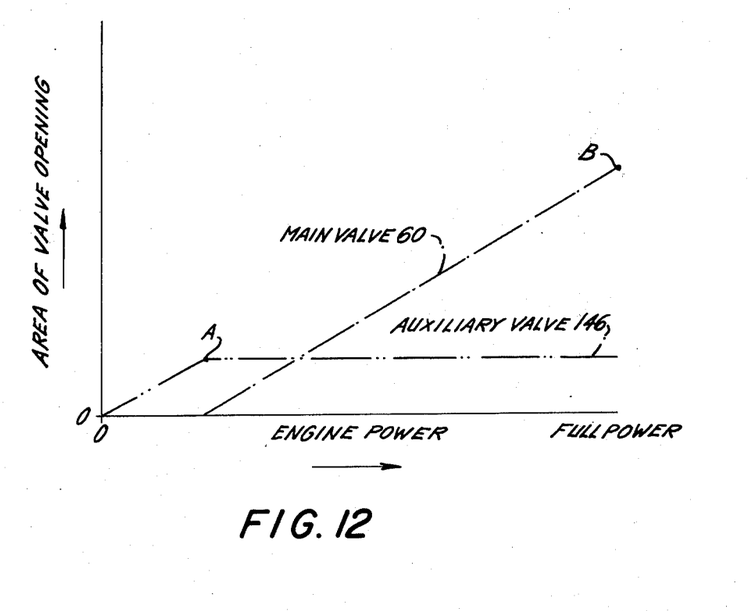
FIG. 12 is a graph showing the change in the area of the throttle valve opening of the two intake valves of FIG. 10 with changes in engine power setting.

The main and auxiliary throttle valves 60 and 146 preferably are interconnected to the engine power control so that as the power control is moved from its off position in a power increasing direction (toward the left as viewed in FIG. 10), first the auxiliary throttle valve 146 opens while the main throttle valve 60 remains closed, with the main throttle valve 60 starting to open approximately when the auxiliary valve reaches its fully open position. In FIG. 10, the main and auxiliary intake valves 60 and 146 are shown in their fully open positions. For the purpose of so interconnecting the two intake valves, the main throttle valve is shown as being connected to the power control link 150 by means of linkage schematically indicated at 152 and a lost-motion connection 154 while the auxiliary throttle valve 146 is connected to said power control link by linkage and a lost-motion connection 158. Spring means 160 are provided for urging the main intake valve 60 toward its fully closed position and spring means 162 are provided for urging the auxiliary throttle valve toward its fully open position. With this arrangement, as the control link 150 is moved to the right (as viewed in FIG. 10) from its full power position shown, main valve spring 160 will cause the main valve 60 to follow in a closing direction until it closes and thereafter the lost-motion connection 154 permits the control link 150 to move further to the right to its full off position. At the same time the lost-motion connection 158 permits the auxiliary throttle 146 to remain in its full open position under the force of the spring 162 until the main valve 60 reaches its closed position and thereafter further motion of control 150 to the right causes the auxiliary valve 146 to move to its closed position. This sequence is reversed when the power control link is moved from its off position in a power increasing direction. The sequential operation of the intake throttle valves 60 and 146 with changes in the engine power setting is graphically illustrated in FIG. 12. As there shown, as the engine is started the auxiliary valve 146 first opens and reaches its full open position at power setting A. Upon further increase in the engine power setting, the main valve 60 starts to open and reaches its full open position at power setting B while the auxiliary valve 146 remains fully open.

As already noted, the invention is not limited to the specific configurations illustrated for a rotary disc-type intake valve and that although particularly applicable to rotary engines with peripheral intake ports, it is also applicable to rotary engines with side intake ports. In addition, the invention is not limited to the rotary engine configuration illustrated in which the engine trochoid surface has two lobes and the rotor has a generally triangular configuration. For example, the engine could be used with a rotary engine having a three-lobe trochoid surface with a generally square rotor. Such a rotary engine is also illustrated in the aforementioned patent to Wankel et al. It should be understood, therefore, that the invention is not limited to the specific details of construction and arrangement thereof herein illustrated and that changes and modifications may occur to one skilled in the art without departing from the spirit or scope of the invention.

What is claimed is:

1. A rotary intake throttle valve configuration for a rotary internal combustion engine having an outer housing body with an internal cavity, the peripheral surface of which has a multi-lobe profile and with said outer body having an intake passage and an exhaust passage opening into said cavity and said engine also having an inner body of generally polygonal profile mounted for relative rotation within said outer body cavity with the apex portions of the inner body having sealing cooperation with said peripheral surface to define a plurality of working chambers which cyclically vary in volume in response to said relative rotation, said intake throttle valve configuration comprising:
   a. said intake passage having a partition at its downstream end and disposed thereacross substantially flush with the surface of said engine cavity and having at least one opening therethrough constituting intake port means;
   b. a rotatable throttle valve member in said intake passage and having a portion disposed adjacent to and against said intake passage partition with its axis of rotation being substantially normal to the inner surface of said partition, said valve member being arranged for cooperation with the intake port means of said partition such that the effective intake port flow area provided by said rotatable valve member varies with the rotative position of said valve member; and c. means operatively connected to said rotatable valve member for connection to the engine power control for varying the rotative position of said valve member thereby to vary the engine power output.

2. A rotary intake throttle valve configuration as claimed in claim 1 in which said valve member and said intake passage port means are arranged so that each working chamber closes earlier to the intake passage at a low power setting of the rotatable valve member as compared to its closing time at a higher power setting.

3. A rotary intake throttle valve configuration as claimed in claim 2 in which said intake port means comprises a plurality of openings in said intake passage partition.

4. A rotary intake throttle valve configuration as claimed in claim 2 in which said port means consists of a plurality of port openings in said intake passage partition and said rotatable valve member has a rotatable disc portion disposed against said partition and having at least one opening therethrough for cooperation with said intake port means.

5. A rotary intake throttle valve configuration as claimed in claim 2 in which said intake passage partition is flush with the multi-lobe peripheral surface of the engine cavity.

6. A rotary intake throttle valve configuration as claimed in claim 2 in which each working chamber not only closes later to the intake passage at high power settings but also opens earlier to said intake passage at said higher power settings.

7. A rotary intake throttle valve configuration as claimed in claim 2 in which the rotary valve member is cup-shaped and is rotatable about its axis with the bottom of the cup-shaped member being disposed adjacent to said intake passage partition for cooperation with said intake port means.

8. A rotary intake throttle valve configuration as claimed in claim 7 in which said intake port means comprises a plurality of openings in said intake passage partition and the bottom of said cup-shaped valve member has a plurality of openings cooperating with said partition openings.

9. A throttle valve and intake port configuration for a rotary internal combustion engine having an outer housing body with an internal cavity, the peripheral surface of which has a multi-lobe profile and with said outer body having intake passage means and exhaust passage means opening into said cavity and said engine also having an inner body of generally polygonal profile mounted for relative rotation within said outer body cavity with the apex portions of the inner body having sealing cooperation with said peripheral surface to define a plurality of working chambers which cyclically vary in volume in response to said relative rotation, said intake throttle valve and port configuration comprising:

a. intake passage means having first and second intake passages with the second intake passage opening through said multi-lobe surface and the first intake passage opening through a side wall of the outer body housing and having a relatively small port area so as to have approximately no overlap with the exhaust port and so the inner body closes the intake port of said first intake passage to each working chamber approximately by the time said chamber reaches its bottom-dead-center position;

b. a first throttle valve for said first intake passage;

c. said second intake passage having a partition at its downstream end and disposed thereacross substantially flush with said multi-lobe surface and having at least one opening therethrough constituting intake port means for said second intake passage;

d. a rotatable throttle valve in said second intake passage and having a portion disposed adjacent to and against said second intake passage partition with its axis of rotation being substantially normal to the inner surface of said partition, said rotatable throttle valve being arranged for cooperation with the intake port means of said partition such that the effective intake port flow area provided by said rotatable throttle valve varies with the rotation position of said rotatable throttle valve and such that each working chamber closes earlier to said second intake passage at a low power setting of the rotatable throttle valve as compared to its closing time at a high power setting; and e. means for operatively connecting said first throttle valve and said rotatable throttle valve to the engine power control.

10. A throttle valve and intake port configuration as recited in claim 9 in which said operative connecting means include means for opening said first throttle valve prior to opening said rotatable throttle valve as the engine power is increased above idling operation.

11. A throttle valve and intake port configuration as recited in claim 10 in which said operative connecting means also includes lost-motion means such that as the engine power is increased the first throttle valve reaches its fully open position before the rotatable throttle valve opens substantially.

* * * * *